US012404867B2

(12) United States Patent
Renaud et al.

(10) Patent No.: US 12,404,867 B2
(45) Date of Patent: Sep. 2, 2025

(54) WHEELS HAVING A BI-LAYERED COATING INCLUDING A HARD COATING LAYER AND METHODS FOR MAKING THE SAME

(71) Applicant: Garrett Transportation I Inc., Torrance, CA (US)

(72) Inventors: Philippe Renaud, Sanchey (FR); Palaniappa Murukesan, Bangalore (IN)

(73) Assignee: Garrett Transportation I Inc., Torrance, CA (US)

( * ) Notice: Subject to any disclaimer, the term of this patent is extended or adjusted under 35 U.S.C. 154(b) by 59 days.

(21) Appl. No.: 18/333,129

(22) Filed: Jun. 12, 2023

(65) Prior Publication Data

US 2024/0301887 A1 Sep. 12, 2024

(30) Foreign Application Priority Data

Mar. 10, 2023 (IN) ............................. 202311016220

(51) Int. Cl.
*F04D 29/02* (2006.01)

(52) U.S. Cl.
CPC ........ *F04D 29/023* (2013.01); *F05D 2230/31* (2013.01); *F05D 2230/90* (2013.01); *F05D 2300/611* (2013.01)

(58) Field of Classification Search
CPC ............... F04D 29/023; F05D 2230/31; F05D 2230/90; F05D 2300/611; F05D 2220/40; F01D 5/288
See application file for complete search history.

(56) References Cited

U.S. PATENT DOCUMENTS

| | | | | |
|---|---|---|---|---|
| 5,441,024 | A | 8/1995 | Wetig et al. | |
| 6,754,954 | B1 | 6/2004 | Decker et al. | |
| 11,566,631 | B2 | 1/2023 | Murukesan et al. | |
| 2008/0278029 | A1* | 11/2008 | Pardo | C23C 18/1605 205/112 |
| 2010/0098532 | A1 | 4/2010 | Diemer et al. | |
| 2010/0148129 | A1 | 6/2010 | Kosowsky et al. | |

(Continued)

FOREIGN PATENT DOCUMENTS

IT 201900007758 A1 12/2020

OTHER PUBLICATIONS

Hadipour et al., "Comparison of H—Cr single layer and Ni-PIH-Cr duplex coating," Surface Engineering, vol. 31, Feb. 29, 2016, p. 665-672.

*Primary Examiner* — Courtney D Heinle
*Assistant Examiner* — Andrew Thanh Bui
(74) *Attorney, Agent, or Firm* — BelayIP

(57) ABSTRACT

A wheel includes a hub portion configured to rotate about a rotational axis. A plurality of blades extends radially outward from the hub portion. Each blade of the plurality of blades includes a leading edge and a trailing edge. The hub portion and the plurality of blades include a substrate metal that includes aluminum or an alloy thereof. The substrate metal of the plurality of blades has coated directly thereon a first coating layer including electroless nickel-phosphorous. The first coating layer has coated directly thereon a second hard coating layer that overlies the leading edges of the plurality of blades and that is formed of a physical vapor deposition-compatible material.

19 Claims, 2 Drawing Sheets

(56) References Cited

U.S. PATENT DOCUMENTS

| | | | | |
|---|---|---|---|---|
| 2010/0159271 | A1* | 6/2010 | Sugioka | F04B 27/0886 428/650 |
| 2011/0002067 | A1 | 1/2011 | Allen | |
| 2011/0229338 | A1 | 9/2011 | Voong et al. | |
| 2014/0178637 | A1 | 6/2014 | Rajagopalan et al. | |
| 2014/0186174 | A1 | 7/2014 | Malfa | |
| 2014/0272166 | A1* | 9/2014 | Shim | F01D 5/288 427/256 |
| 2014/0339699 | A1 | 11/2014 | Arvin et al. | |
| 2015/0004021 | A1* | 1/2015 | Kang | F04B 39/122 417/410.1 |
| 2015/0111061 | A1* | 4/2015 | Shen | C22C 19/07 148/121 |
| 2015/0118090 | A1 | 4/2015 | Lachey et al. | |
| 2015/0132539 | A1 | 5/2015 | Bailey et al. | |
| 2017/0009350 | A1 | 1/2017 | Myllymaki et al. | |
| 2017/0283220 | A1 | 10/2017 | Ding et al. | |
| 2018/0045215 | A1 | 2/2018 | Arai et al. | |

* cited by examiner

WHEELS HAVING A BI-LAYERED COATING INCLUDING A HARD COATING LAYER AND METHODS FOR MAKING THE SAME

CROSS-REFERENCE TO RELATED APPLICATIONS

This application is related to and claims all available benefit of Indian Provisional Patent Application IPA: 202311016220 filed Mar. 10, 2023, the entire contents of which are herein incorporated by reference.

TECHNICAL FIELD

The present disclosure generally relates to wheels for turbo-devices, for example, turbochargers, turbines or turbomachines, and/or the like. More particularly, the present disclosure relates to wheels having a bi-layered coating of an electroless nickel-phosphorous base layer and a hard coating top layer formed thereon and methods for making the same.

BACKGROUND

Turbo-devices can be used in a variety of applications. For example, turbochargers for gasoline and diesel internal combustion engines are devices known in the art that are used for pressurizing or boosting the intake air stream, routed to a combustion chamber of the engine, by using the heat and volumetric flow of exhaust gas exiting the engine. Another example includes turbines or turbomachines for fuel cells. The turbine may be operatively connected to a fuel cell system and may be configured as an e-charger, electric turbocharger, or other turbo-device for the fuel cell.

In the case of turbochargers for internal combustion engines, the exhaust gas exiting the engine is routed into a turbine housing of a turbocharger in a manner that causes an exhaust gas-driven turbine wheel to spin within the housing. The exhaust gas-driven turbine wheel is mounted onto one end of a shaft that is common to a radial air compressor mounted onto an opposite end of the shaft and housed in a compressor housing. Thus, rotary action of the turbine wheel also causes the air compressor to spin within a compressor housing of the turbocharger that is separate from the turbine housing. The spinning action of the air compressor causes intake air to enter the compressor housing and be pressurized or boosted to a desired amount before it is mixed with fuel and combusted within the engine combustion chamber.

In recent years, there has been increasing pressure in the form of governmental legislation to reduce internal combustion engine emissions, such as $NO_x$ and particulate matter (PM). Oxides of nitrogen ($NO_x$) may be formed when temperatures in the combustion chamber are about 2500° F. or hotter. At these elevated temperatures, the nitrogen and oxygen in the combustion chamber may chemically combine to form nitrous oxides.

Exhaust gas recirculation (EGR) is a method that has been used to reduce the level of $NO_x$ in exhaust gases. In EGR systems, some of the exhaust gases that would otherwise be discharged into the environment are recirculated into the intake stream. The recirculated exhaust gases have already combusted and have a significantly lower oxygen content, so they do not burn again when they are recirculated. The exhaust gases may displace some of the normal intake charge. As a result, the combustion process may be cooler by several hundred degrees so that $NO_x$ formation may be reduced.

The use of EGR, however, results in an increased amount of water that is condensed out of the recirculated exhaust gasses. The amount of water that is condensed may depend, for example, on temperature, humidity, and operating speed of the engine. When present, the condensed water droplets in the intake stream are passed through an inlet and impact the spinning compressor wheel, and as a result, an erosive effect may be observed over time. This can cause the components to prematurely fail.

Similarly in turbines for fuel cells, when present, condensed water droplets in the intake stream are passed through an inlet and impact the spinning fuel cell turbine wheel, and as a result, an erosive effect may also be observed over time. As a result, such components as well may prematurely fail.

Accordingly, it is desirable to provide wheels for turbo-devices that are able to withstand the erosive effects of water droplets, without requiring the use of heavier and relatively expensive materials. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Wheels having a bi-layered coating of an electroless nickel-phosphorous base layer and a hard coating top layer formed thereon and methods for making the same, are disclosed herein.

In an exemplary embodiment, a wheel includes a hub portion configured to rotate about a rotational axis. A plurality of blades extends radially outward from the hub portion. Each blade of the plurality of blades includes a leading edge and a trailing edge. The hub portion and the plurality of blades include a substrate metal that includes aluminum or an alloy thereof. The substrate metal of the plurality of blades has coated directly thereon a first coating layer including electroless nickel-phosphorous. The first coating layer has coated directly thereon a second hard coating layer overlaying the leading edges of the plurality of blades and formed of a physical vapor deposition (PVD)-compatible material.

In another exemplary embodiment, a wheel includes a hub portion configured to rotate about a rotational axis. A plurality of blades extends radially outward from the hub portion. Each blade of the plurality of blades includes a leading edge and a trailing edge. The hub portion and the plurality of blades include a substrate metal that includes aluminum or an alloy thereof. The substrate metal of the plurality of blades has coated directly thereon a first coating layer including electroless nickel-phosphorous. The first coating layer has coated directly thereon a second hard coating layer overlaying the leading edges of the plurality of blades. The second hard coating layer has a hardness of greater than about 800 HV and includes a material chosen from the group of carbides, nitrides, diamond like carbon (DLC), or combinations thereof. The leading edges are positioned longitudinally forward from the trailing edges of the plurality of blades along the rotational axis with respect to a flow of air along the wheel when the wheel is rotating. The second hard coating layer has a thickness along the leading edges of from about 1 to about 10 microns and the thickness reduces in a gradually tapering manner rearward towards the trailing edges such that the thickness of the second hard coating layer is zero microns at or longitudinally forward of the trailing edges of the plurality of blades.

In another exemplary embodiment, a method for making a wheel includes providing a substrate wheel. The substrate wheel includes a hub portion configured to rotate about a rotational axis. A plurality of blades extends radially outward from the hub portion. Each blade of the plurality of blades comprises a leading edge and a trailing edge. The hub portion and the plurality of blades include a substrate metal that includes aluminum or an alloy thereof. The method further includes forming on the substrate metal of the hub portion and the plurality of blades a first coating layer including electroless nickel-phosphorous. Forming the first coating layer includes immersing the substrate wheel in an electroless nickel-phosphorous plating bath that includes nickel cations and phosphorous oxide anions and subsequently, exposing the substrate wheel including the first coating layer to a heat treatment process to thereby increase adhesion strength of the first coating layer to the substrate metal. The method further includes forming a second hard coating layer from a physical vapor deposition (PVD)-compatible material on the first coating layer overlying the leading edges of the plurality of blades.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The inventive subject matter will hereinafter be described in conjunction with the following drawing figures, wherein like numerals denote like elements, and wherein.

DETAILED DESCRIPTION

Figure 1:
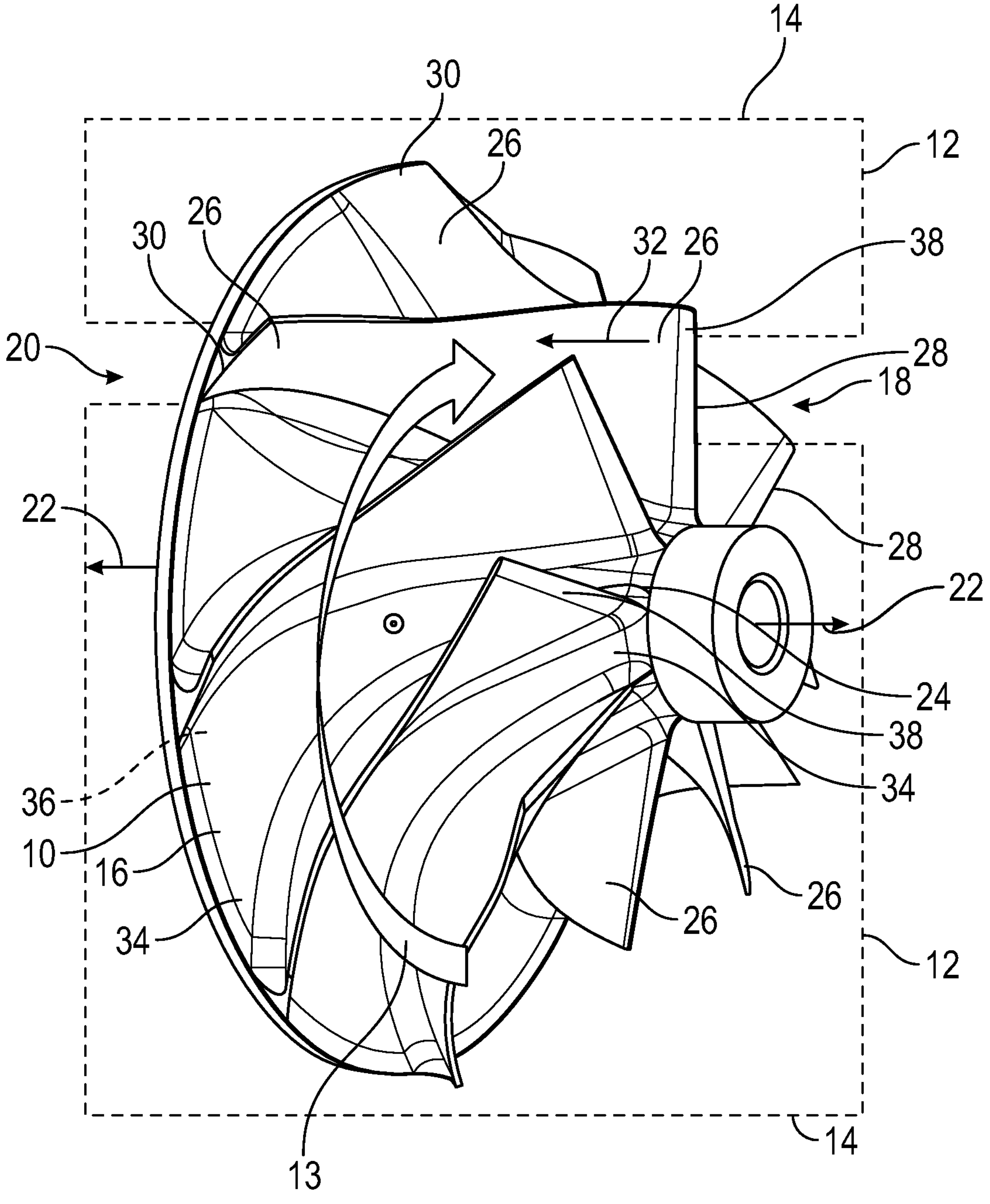
FIG. 1 is a perspective view of a wheel operatively disposed in a turbo-device, which is schematically illustrated, in accordance with some embodiments of the present disclosure.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Unless specifically stated or obvious from context, as used herein, the term "about" is understood as within a range of normal tolerance in the art, for example within 2 standard deviations of the mean. "About" can be understood as within 10%, 5%, 1%, 0.5%, 0.1%, 0.05%, or 0.01% of the stated value. "About" can alternatively be understood as implying the exact value stated. Unless otherwise clear from the context, all numerical values provided herein are modified by the term "about."

The present disclosure is generally directed to wheels for turbo-devices in which the wheels have a bi-layered coating of an electroless nickel-phosphorous base layer and a hard coating top layer, and methods for making the same. In particular, the present disclosure addresses the aforementioned erosion problem with the use of electroless nickel-phosphorus as a base layer followed by a hard coating top layer. The purpose of the electroless nickel-phosphorous layer as a base layer is to minimize the difference in hardness between the relatively hard coating top layer and the relatively soft aluminum substrate. That is, a hard coating top layer disposed directly on the soft aluminum substrate could potentially compromise fatigue properties due to a poor combination of mechanical strength and coefficient of thermal expansion mismatch between the aluminum substrate and the hard coating top layer.

The present disclosure utilizes a relatively high phosphorus content (for example, greater than or equal to about 10 wt. %) electroless nickel-phosphorous coating as the base coating. The combination of a relatively high phosphorus content and controlled process parameters ensures a compressive residual stress in the coating that will help to reduce potential issues of the wheel due to fatigue. The aforesaid base layer of electroless nickel-phosphorous covers the entire wheel (e.g., hub portion and blades), with the exception of several functional regions for reasons of manufacture/assembly. The functional regions not requiring the coating are masked during the process. As will be discussed in further detail below, in some embodiments, the wheel is subjected to a heat treating process after deposition of the electroless nickel-phosphorous to improve adhesion.

To provide additional hardness, the aforesaid hard coating layer is employed, which has a hardness greater than about 800 HV, or greater than about 900 HV. In accordance with some embodiments, the hard coating layer is provided only on the leading edge regions of the blades of the wheel, using a physical vapor deposition (PVD) technique(s). This selective provision is achieved by positioning the wheel in an PVD vacuum cell in a manner such that the leading edges face the deposition electrode surface, focusing a deposition of PVD-compatible material(s) towards and onto the leading edges. The PVD deposition process is performed such that the thickness of the hard coating layer is greatest at the leading edges (for example, a thickness from about 1 to about 10 microns) and then gradually decreases (in a tapering manner) towards the back-disc of the wheel. Erosion from water droplets has been found to be greatest at the leading edges. At the fillet root (e.g., transition region between the blades and hub portion), which is the area of maximum stress during operation, the thickness is reduced to about 0 microns, such that the effect of tensile stresses caused by the additional of the hard coating layer is effectively eliminated at those locations.

Referring to FIG. 1, a perspective view of a wheel 10 operatively disposed in a turbo-device 12 is provided. In the illustrated embodiment, the turbo-device 12 is configured as a turbocharger 14 for an internal combustion engine and the wheel 10 is configured as a turbocharger compressor wheel 16. A non-limiting example of turbochargers for internal combustion engines including turbocharger compressor wheels is described in U.S. Pat. No. 11,566,631, filed on Mar. 29, 2021, which is owned by the assignee of the present application and is hereby incorporated by reference in its entirety for all purposes.

As illustrated, the wheel 10 is operatively disposed in the turbo-device 12 between an inlet 18 and an outlet 20 to rotate (indicated by single headed arrow 13) about a rotational axis 22. The wheel 10 is a radial wheel that includes a hub portion 24 and a plurality of blades 26 that extend radially outward from the hub portion 24. The blades 26 have a backward curvature rather than being configured to extend in a purely radial blade configuration. Each blade 26 includes a leading edge 28 that is in fluid communication with the inlet 18 and a trailing edge 30 that is in fluid communication with the outlet 20. The leading edges 28 define the beginning of an intake area for the combined set of blades 26, extending through the circular paths of roughly the upstream ⅓ of the blades 26. The trailing edges 30 define the end of an annular output area for the combined set of blades 26, extending through the circular paths of roughly the downstream ⅓ of the blades 26.

During operation of the turbo-device 12, the wheel 10 rotates about the rotational axis 22 and the leading edges 28 receive intake air that passes through the inlet 18 and advances rearwardly (indicated by single headed arrow 32) along the blades 26 towards the trailing edges 30. As such, the leading edges 28 are positioned longitudinally forward of the trailing edges 30 of the blades 26 with respect to the rotational axis 22 and the flow of air 32 along the wheel 10. As noted above, the wheel 10 is a turbocharger compressor wheel 16 in which the blades 26 are configured to compress the intake air to form compressed or pressurized air. The pressurized air passes from the trailing edges 30 and is ejected out through the outlet 20.

In some embodiments, the hub portion 24 and the blades 26 are formed of a substrate metal 36, such as, aluminum or an aluminum alloy, for example, via a casting and/or machining process. The wheel 10 is provided with a first (base) coating layer 34 on and overlying the substrate metal 36 and includes electroless nickel-phosphorous. The phosphorous content of the first coating layer 34 may be greater than or equal to about 10 wt. %, for example from about 10 to about 15 wt. %, such as from about 11 to about 15 wt. %, or about 12 to about 15 wt. %. The thickness of the first coating layer 34 may be from about 5 to about 30 microns, for example about 10 to about 30 microns. The first coating layer 34 may be provided on all or most of the surfaces of the wheel 10, both forward and rear facing. If the first coating layer 34 is not provided on all of the surfaces, the surfaces not coated with the first coating layer 34 may include functional surfaces, such as portions of the back facing hub portion 24 about the centerline (axis of rotation 22) or portions of the forward facing hub portion 24. As will be discussed in further detail below, in some embodiments, the wheel 10 has been subjected to a heat treating process after deposition of the electroless nickel-phosphorous to improve adhesion of the first coating layer 34 to the substrate metal 36.

The wheel 10 is provided with a second (top) hard coating layer 38 on and overlying portions of the first coating layer 34 and includes or is formed of a hard, physical vapor deposition (PVD)-compatible material. As used herein, the phrase "PVD-compatible material" is understood to mean a material(s) or compound(s) that can be formed by but not necessarily limited to a PVD process using one or more precursor materials.

The second hard coating layer 38 has a thickness over the first coating layer 34 that varies gradually (in a tapering manner) across the forward-facing surfaces of the wheel 10 including the blades 26. In an embodiment, the thickness of the second hard coating layer 38 is greatest at the leading edges 28. This greatest thickness may be from about 1 to about 10 microns, such as about 1 to about 5 microns. The thickness of the second hard coating layer 38 gradually decreases from the leading edges 28 rearwardly in the direction towards of the trailing edges 30, for example, along both sides (e.g., compression side and suction side) of each of the blades 26. In embodiments, the thickness of the second hard coating layer 38 at the trailing edges 30 is 0 or about 0 microns. In such embodiments, it is not necessary that the thickness reach 0 microns exactly at the trailing edges 30 as it decreases from the leading edges 28. Rather, the thickness of the second hard coating layer 38 may reach 0 microns at any percentage of the overall distance rearwardly from the leading edges 28 to the trailing edges 30 (e.g., longitudinally forward of the trailing edges 30), for example from about 20% to about 80%, or about 30% to about 70%.

In an embodiment, the PVD-compatible material that forms the second hard coating layer 38 is chosen from carbides, for example, chromium carbide ($Cr_3C_2$), silicon carbide (SiC), tungsten carbide (WC), zirconium oxycarbide (ZrOC), nitrides, for example, boron nitride (BN), chromium nitride (CrN), titanium nitride (TiN), titanium carbonitride (TiCN), zirconium nitride (ZrN), diamond like carbon (DLC), or combinations thereof. In an embodiment, the second hard coating layer 38 has a hardness of greater than about 800 HV, such as greater than about 900 HV, for example from about 1,000 to about 3,500 HV.

Figure 2:
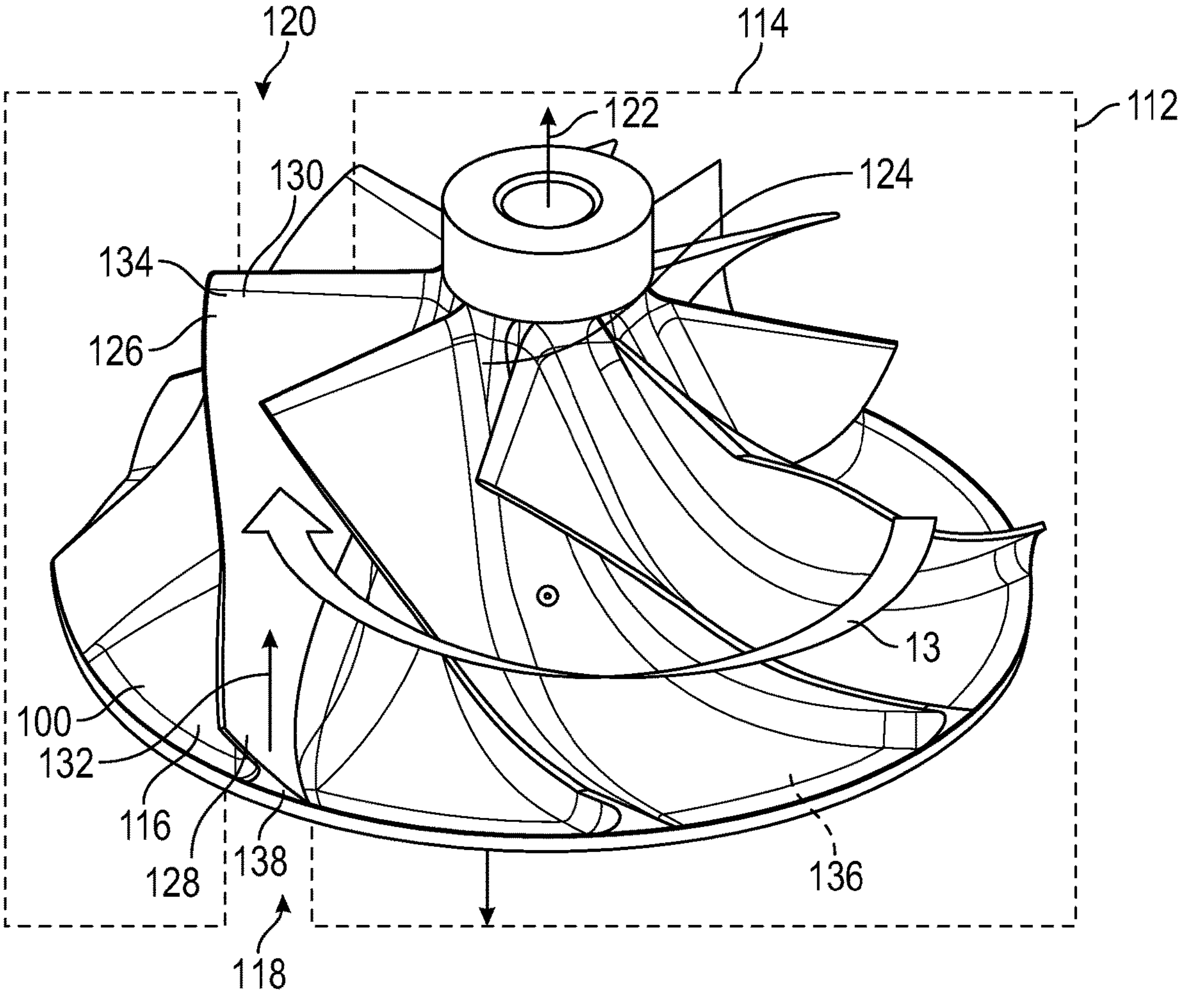
FIG. 2 is a perspective view of a wheel operatively disposed in a turbo-device, which is schematically illustrated, in accordance with some embodiments of the present disclosure.

Referring to FIG. 2, a wheel 100 that is operatively disposed in a turbo-device 112 between an inlet 118 and an outlet 120 is provided. In the illustrated embodiment, the turbo-device is a turbine 114 for fuel cells and the wheel 100 is configured as a fuel cell turbine wheel 116. A non-limiting example of turbines for fuel cells including fuel cell turbine wheels is described in U.S. Patent Application Publication No. 2022/0006369, filed on Jul. 1, 2020, which is owned by the assignee of the present application and is hereby incorporated by reference in its entirety for all purposes.

In particular, the wheel 100 including the rotational axis 122, the hub portion 124, the blades 126, the leading edges 128, the trailing edges 130, the substrate metal 136, the first coating layer 134, and the second hard coating layer 138 are similarly configured to the wheel 10 as discussed above in relation to FIG. 1 including the rotational axis 22, the hub portion 24, the blades 26, the leading edges 28, the trailing edges 30, the substrate metal 136, the first coating layer 134, and the second hard coating layer 138, respectively, but with the exception that the blades 126 are configured to expand the intake air received from the inlet 118, along the airflow direction 132 towards the trailing edges 130 to form an expanded or depressurized air. The expanded or depressurized air passes from the trailing edges 130 and is ejected out through the outlet 120.

Figure 3:
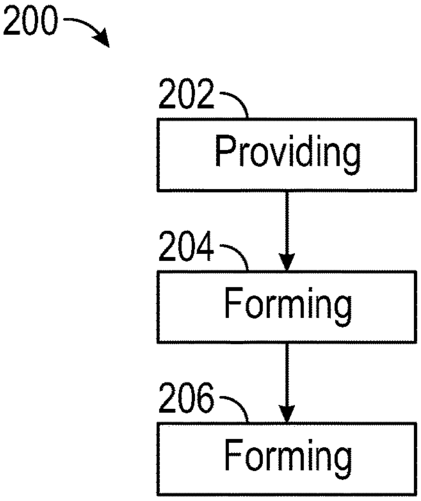
FIG. 3 is a flowchart illustrating a method for making a wheel in accordance with some embodiments of the present disclosure.

Referring to FIG. 3, the compressor wheel 10, 100 as discussed above may be made in accordance with a method 200 as illustrated in the flowchart. The method 200 includes a step 202 of providing a substrate wheel formed of a substrate metal, specifically a wheel made of aluminum (or alloy thereof) in the configuration discussed above in relation to FIGS. 1-2, with the exception of the coating layers. The substrate wheel may be manufactured using conventional manufacturing processes, such as casting and/or machining, or the like.

The method 200 continues with a step 204 of forming (e.g., via depositing) a first (base) electroless nickel-phosphorous coating layer onto the substrate metal of the substrate wheel. Electroless nickel-phosphorus plating is a chemical process that deposits an even layer of nickel-phosphorus alloy on the surface of the substrate metal. The process involves dipping the substrate wheel in a water solution containing a nickel salt and a phosphorus-containing reducing agent, for example a hypophosphite salt. The concentration of the phosphorous-containing reducing agent is selected so as to achieve a phosphorous amount in the first coating layer greater than or equal to about 10 wt. %, as described above. The reduction of the metal cations in solution to metallic form is achieved by purely chemical means, through an autocatalytic reaction. Before plating, the surface of the substrate may be cleaned. Cleaning may be achieved by a series of chemical baths, including non-polar solvents to remove oils and greases, as well as acids and alkalis to remove oxides, insoluble organics, and other surface contaminants. Further, functional portions of the substrate metal, as described above, may be optionally masked. Ingredients of the electroless nickel plating bath include a source of nickel cations $Ni^{2+}$, for example nickel sulfate and a suitable reducing agent, such as hypophosphite $H_2PO_3^-$. The plating bath may further include complexing agents, such as carboxylic acids or amines; stabilizers, such as lead salts or sulfur compounds; buffers; surfactants; and accelerators. The plating process is controlled with temperature and time to achieve a desired uniform thickness of about 20 to about 30 microns, as described above. Once Ni—P plating is complete, the substrate metal, now having the first coating layer plated thereon, may be rinsed to remove any residues from the plating process, and the masking (if any) may be removed. In an exemplary embodiment, after plating, the substrate wheel including the first electroless nickel-phosphorous coating layer is heat treated, for example at a temperature of from about 100 to about 150° C. for a time of from about 1 to about 4 hours, to increase the adhesion strength of the first electroless nickel-phosphorous coating layer to the underlying substrate metal.

The method 200 continues with a step 206 of forming a second hard coating layer over the first Ni-Player via a physical vapor deposition (PVD) process. As discussed above, the second hard coating layer is formed by depositing a PVD-compatible material that provides a hard coating layer, for example, greater than about 800 HV, or greater than about 900 HV, over the Ni-Player. In particular, the PVD process is a vaporization coating technique, involving the transfer of material on an atomic level under vacuum conditions. The PVD precursor materials start out in a solid form and are vaporized and deposited onto the Ni—P coated substrate. The PVD process may include an initial step of placing the Ni—P coated substrate in a PVD vacuum chamber. The precursor material(s) that form the PVD-compatible material(s) is/are evaporated by a high energy source such as an electron beam. The vaporized material(s) is transported to the Ni—P coated substrate. A reaction occurs between the metal atoms and the appropriate reactive gas (such as oxygen, nitrogen, or methane) and the second hard coating layer is deposited onto the Ni—P coated substrate.

In an embodiment, the PVD process includes processing conditions including a process deposition temperature of about 250° C. or less, for example, from about 70 to about 250° C. Advantageously, in some embodiments, depositing the PVD-compatible material on the first coating layer at the process deposition temperature of about 250° C. or less, helps ensure that the aluminum or aluminum alloy substrate metal is dimensionally, structurally, and/or mechanically unaffected or otherwise remains stable/unchanged.

The method 200 may optionally include performing various finishing processes, such as final cleaning, polishing, machining, heat treatment at temperatures of up to about 250° C. (for example from about 200° C. to about 250° C.) for time period of about 1 hour to about 4 hours, such as about 2 hours to about 4 hours, and others as conventionally known in the art. The result is a wheel 10, 100 in accordance with that described above in connection with FIGS. 1-2.

Accordingly, the present disclosure has provided wheels for turbo-devices having a bi-layered coating of an electroless nickel-phosphorous base layer and a hard coating top layer, and methods for making the same. The present disclosure has addressed the aforementioned erosion problem with the use of electroless nickel-phosphorus as a base layer followed by a hard coating top layer, located in greatest thickness near the leading edges of the blades. As such, the wheels of the present disclosure are able to withstand the erosive effects of water droplets, without requiring the use of heavier and more expensive materials, such as, for example, titanium. Moreover, the wheels disclosed herein are able to be manufactured easily with existing technologies, such as chemical deposition and physical vapor deposition that do not result in significant additional manufacturing complexity or expense.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A wheel comprising:

a hub portion configured to rotate about a rotational axis; and a plurality of blades extending radially outward from the hub portion, wherein each blade of the plurality of blades comprises a leading edge and a trailing edge, wherein the hub portion and the plurality of blades comprise a substrate metal that comprises aluminum or an alloy thereof, wherein the substrate metal of the plurality of blades has coated directly thereon a first coating layer comprising electroless nickel-phosphorous that comprises a phosphorous content of 12 wt. % to 15 wt. %, and wherein the first coating layer is formed by electroless plating and is subsequently heat treated to enhance adhesion to the substrate metal, and wherein the first coating layer has coated directly thereon a second hard coating layer overlaying the leading edges of the plurality of blades and formed of a physical vapor deposition (PVD)-compatible material, wherein the second hard coating layer has a thickness that is greatest at the leading edges and decreases rearward in a gradually tapering manner such that the thickness is zero microns at or longitudinally forward of the trailing edges of the plurality of blades.

2. The wheel of claim 1, wherein the PVD-compatible material is chosen from the group of carbides, nitrides, diamond like carbon (DLC), or combinations thereof.

3. The wheel of claim 2, wherein the PVD-compatible material is chosen from the group of chromium carbide (CnC2), silicon carbide (SiC), tungsten carbide (WC), zirconium oxycarbide (ZrOC), boron nitride (BN), chromium nitride (CrN), titanium nitride (TiN), titanium carbonitride (TiCN), zirconium nitride (ZrN), DLC, or combinations thereof.

4. The wheel of claim 1, wherein the leading edges are positioned longitudinally forward from the trailing edges of the plurality of blades along the rotational axis with respect to a flow of air along the wheel when the wheel is rotating, and wherein the second hard coating layer has a thickness that is greatest at the leading edges and that decreases rearward towards the trailing edges.

5. The wheel of claim 4, wherein the thickness of the second hard coating layer along the leading edges of the plurality of blades is from about 1 microns to about 10 microns.

6. The wheel of claim 4, wherein the thickness of the second hard coating layer reduces in a gradually tapering manner rearward towards the trailing edges of the plurality of blades such that the thickness of the second hard coating layer is zero microns at or longitudinally forward of the trailing edges of the plurality of blades.

7. The wheel of claim 1, wherein the first coating layer extends directly on the substrate metal of the hub portion.

8. The wheel of claim 7, wherein the first coating layer comprises electroless nickel-phosphorous having a constant thickness across the hub portion and the plurality of blades of from about 5 microns to about 30 microns.

9. The wheel of claim 1, wherein the second hard coating layer has a hardness of greater than about 800 HV.

10. The wheel of claim 1, wherein the second hard coating layer has a hardness of from about 1,000 HV to about 3,500 HV.

11. The wheel of claim 1, wherein the wheel is configured as a turbocharger compressor wheel or a fuel cell turbine wheel.

12. A wheel comprising:

a hub portion configured to rotate about a rotational axis; and a plurality of blades extending radially outward from the hub portion, wherein each blade of the plurality of blades comprises a leading edge and a trailing edge, wherein the hub portion and the plurality of blades comprise a substrate metal that comprises aluminum or an alloy thereof, wherein the substrate metal of the plurality of blades has coated directly thereon a first coating layer comprising electroless nickel-phosphorous that comprises a phosphorous content of 12 wt. % to 15 wt. %, and wherein the first coating layer has coated directly thereon a second hard coating layer overlaying the leading edges of the plurality of blades, wherein the second hard coating layer has a hardness of greater than about 800 HV and comprises a material chosen from the group of carbides, nitrides, diamond like carbon (DLC), or combinations thereof, wherein the leading edges are positioned longitudinally forward from the trailing edges of the plurality of blades along the rotational axis with respect to a flow of air along the wheel when the wheel is rotating, and wherein the second hard coating layer has a thickness along the leading edges of from about 1 to about 10 microns and the thickness reduces in a gradually tapering manner rearward towards the trailing edges such that the thickness of the second hard coating layer is zero microns at or longitudinally forward of the trailing edges of the plurality of blades.

13. A method for making a wheel, the method comprising: providing a substrate wheel that comprises:

a hub portion configured to rotate about a rotational axis, and a plurality of blades extending radially outward from the hub portion, wherein each blade of the plurality of blades comprises a leading edge and a trailing edge, wherein the hub portion and the plurality of blades comprise a substrate metal that comprises aluminum or an alloy thereof;

forming on the substrate metal of the hub portion and the plurality of blades a first coating layer comprising electroless nickel-phosphorous that comprises a phosphorous content of 12 wt. % to 15 wt. %, wherein forming the first coating layer comprises immersing the substrate wheel in an electroless nickel-phosphorous plating bath comprising nickel cations and phosphorous oxide anions and subsequently, exposing the substrate wheel including the first coating layer to a heat treatment process to thereby increase adhesion strength of the first coating layer to the substrate metal; and forming a second hard coating layer from a physical vapor deposition (PVD)-compatible material on the first coating layer overlying the leading edges of the plurality of blades, wherein forming the second hard coating layer comprises depositing the PVD-compatible material at a process deposition temperature 250° C. or less, and wherein the second hard coating layer has a thickness that is greatest at the leading edges and that decreases rearward in a gradually tapering manner such that the thickness is zero microns at or longitudinally forward of the trailing edges of the plurality of blades.

14. The method of claim 13, wherein exposing the substrate wheel to the heat treatment process includes exposing the substrate wheel including the first coating layer to a temperature of from about 100° C. to about 150° C. for a time of from about 1 to about 4 hours.

15. The method of claim 13, wherein forming the second hard coating layer comprises forming the second hard coating layer using a PVD process that includes processing conditions including a process deposition temperature, and wherein forming the second hard coating comprises depositing the PVD-compatible material on the first coating layer at the process deposition temperature of about 250° C. or less.

16. The method of claim 15, wherein forming the second hard coating comprises depositing the PVD-compatible material on the first coating layer at the process deposition temperature of from about 70° C. to about 250° C.

17. The method of claim 13, wherein the leading edges are positioned longitudinally forward from the trailing edges of the plurality of blades along the rotational axis with respect to a flow of air along the wheel when the wheel is rotating, and wherein forming the second hard coating comprises forming the second hard coating layer having a thickness that is greatest at the leading edges and that decreases rearward towards the trailing edges.

18. The method of claim 17, wherein forming the second hard coating comprises forming the second hard coating layer such that the thickness of the second hard coating layer reduces in a gradually tapering manner rearward towards the trailing edges of the plurality of blades and is zero microns at or longitudinally forward of the trailing edges of the plurality of blades.

19. The method of claim 13, wherein forming the second hard coating comprises forming the second hard coating having a hardness of from about 1,000 HV to about 3,500 HV.

* * * * *